(12) United States Patent
Volkovs et al.

(10) Patent No.: US 11,397,765 B2
(45) Date of Patent: Jul. 26, 2022

(54) AUTOMATED IMAGE RETRIEVAL WITH IMAGE GRAPH

(71) Applicant: THE TORONTO-DOMINION BANK, Toronto (CA)

(72) Inventors: Maksims Volkovs, Toronto (CA);
Cheng Chang, Toronto (CA);
Guangwei Yu, Toronto (CA); Chundi Liu, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 483 days.

(21) Appl. No.: 16/592,006

(22) Filed: Oct. 3, 2019

(65) Prior Publication Data

US 2020/0159766 A1 May 21, 2020

Related U.S. Application Data

(60) Provisional application No. 62/770,159, filed on Nov. 20, 2018.

(51) Int. Cl.
*G06K 9/60* (2006.01)
*G06F 16/583* (2019.01)
(Continued)

(52) U.S. Cl.
CPC ........ *G06F 16/583* (2019.01); *G06F 16/5866* (2019.01); *G06F 16/9024* (2019.01); *G06F 16/9032* (2019.01); *G06F 16/90348* (2019.01)

(58) Field of Classification Search
CPC .............. G06F 16/583; G06F 16/5866; G06F 16/9024; G06F 16/9032; G06F 16/90348;
(Continued)

(56) References Cited

U.S. PATENT DOCUMENTS

2006/0015495 A1* 1/2006 Keating .............. G06F 16/5838
2013/0230255 A1 9/2013 Wang et al.
(Continued)

FOREIGN PATENT DOCUMENTS

CN 106557728 A 4/2017
CN 106776896 A 5/2017

OTHER PUBLICATIONS

Arandjelovic, R. et al., "NetVLAD: CNN Architecture for Weakly Supervised Place Recognition," IEEE Transactions on Pattern Analysis and Machine Intelligence, vol. 40, No. 6, Jun. 2018, pp. 1437-1451.
(Continued)

*Primary Examiner* — Duy M Dang
(74) *Attorney, Agent, or Firm* — Patent Capital Group

(57) ABSTRACT

An image retrieval system receives an image for which to identify relevant images from an image repository. Relevant images may be of the same environment or object and features and other characteristics. Images in the repository are represented in an image retrieval graph by a set of image nodes connected by edges to other related image nodes with edge weights representing the similarity of the nodes to each other. Based on the received image, the image traversal system identifies an image in the image retrieval graph and alternatively explores and traverses (also termed "exploits") the image nodes with the edge weights. In the exploration step, image nodes in an exploration set are evaluated to identify connected nodes that are added to a traversal set of image nodes. In the traversal step, the relevant nodes in the traversal set are added to the exploration set and a query result set.

20 Claims, 7 Drawing Sheets

(51) Int. Cl.
  *G06F 16/903* (2019.01)
  *G06F 16/58* (2019.01)
  *G06F 16/901* (2019.01)
  *G06F 16/9032* (2019.01)

(58) Field of Classification Search
  CPC ........ G06F 16/00; G06F 16/90; G06F 16/901;
    G06F 16/903; G06F 16/95; G06F 16/953;
    G06F 16/50; G06F 16/51; G06F 16/532;
    G06F 16/5854; G06K 9/6276; G06K
    9/6296; G06V 10/751
  See application file for complete search history.

(56) References Cited

U.S. PATENT DOCUMENTS

| | | | |
|---|---|---|---|
| 2016/0042252 A1* | 2/2016 | Sawhney | G06F 16/55 382/190 |
| 2017/0372162 A1 | 12/2017 | Wang et al. | |
| 2021/0049202 A1* | 2/2021 | Liu | G06N 3/08 |

OTHER PUBLICATIONS

Arandjelovic, R. et al., "Three things everyone should know to improve object retrieval," 2012 IEEE Conference on Computer Vision and Pattern Recognition, Jun. 2012, pp. 1-8.
Babenko, A. et al., "Aggregating Local Deep Features for Image Retrieval," The IEEE International Conference on Computer Vision (ICCV), Dec. 2015, pp. 1269-1277.
Bai, S. et al., "Ensemble diffusion for retrieval," Computer Vision and Pattern Recognition, Oct. 2017, pp. 774-783.
Bai, S. et al., "Regularized Diffusion Process on Bidirectional Context for Object Retrieval," IEEE Transactions on Pattern Analysis and Machine Intelligence, vol. 41, Iss. 5, Apr. 20, 2018, pp. 1213-1226.
Chum, O. et al., "Large-Scale Discovery of Spatially Related Images," IEEE Transactions on Pattern Analysis and Machine Intelligence, vol. 32, No. 2, Feb. 2010, pp. 371-377.
Chum, O. et al., "Total Recall: Automatic Query Expansion with a Generative Feature Model for Object Retrieval," 2007 IEEE 11th International Conference on Computer Vision, Oct. 2007, pp. 1-8.
Donoser, M. et al., "Diffusion processes for retrieval revisited," The IEEE Conference on Computer Vision and Pattern Recognition (CVPR), Jun. 2013, pp. 1320-1327.
Fischler, M. A. et al., "Random sample consensus: a paradigm for model fitting with applications to image analysis and automated cartography," Mar. 1980, pp. 1-37.
Gordo, A. et al., "End-to-End Learning of Deep Visual Representations for Image Retrieval," International Journal of Computer Vision, vol. 124, Jun. 5, 2017, pp. 237-254.
Gordo, A. et al., "Deep Image Retrieval: Learning global representations for image search," arXiv: 1604.01325v2, Jul. 28, 2016, pp. 1-21.
Heinly, J. et al., "Reconstructing the World* in Six Days *(As Captured by the Yahoo 100 Million Image Dataset)," IEEE Conference on Computer Vision and Pattern Recognition (CVPR), Jun. 2015, pp. 3287-3295.
Iscen, A. et al., "Efficient diffusion on region manifolds: Recovering small objects with compact CNN representations," IEEE Conference on Computer Vision and Pattern Recognition (CVPR), Jul. 2017, pp. 2077-2086.
Iscen, A. et al., "Fast Spectral Ranking for Similarity Search," IEEE Computer Vision and Pattern Recognition Conference, Jun. 2018, pp. 7632-7641.
Iscen, A. et al., "Hybrid diffusion: Spectral-temporal graph filtering for manifold ranking," arXiv:1807.08692, Nov. 22, 2018, pp. 1-16.

Kalpathy-Cramer, J et al., "Evaluating performance of biomedical image retrieval systems—an overview of the medical image retrieval task at ImageCLEF 2004-2013," Comput Med Imaging Graph, vol. 39, Jan. 2015, pp. 55-61.
Lowe, D. G., "Distinctive Image Features from Scale-Invariant Keypoints," International Journal of Computer Vision, Jan. 5, 2004, pp. 1-28.
Mikolajczyk, K. et al., "Scale & affine invariant interest point detectors," International Journal of Computer Vision, vol. 60, No. 1, Oct. 2004, pp. 63-86.
Mishkin, D. et al., "Repeatability is not enough: Learning affine regions via discriminability," arXiv: 1711.06704, Jul. 25, 2018, pp. 1-17.
Noh, H. et al., "Large-Scale Image Retrieval with Attentive Deep Local Features," Proceedings of the IEEE International Conference on Computer Vision, Oct. 2017, pp. 3456-3465.
PCT International Search Report and Written Opinion, PCT Application No. PCT/CA2019/051432, dated Jan. 7, 2020, nine pages.
Philbin, J. et al., "Lost in Quantization: Improving Particular Object Retrieval in Large Scale Image Databases," 2008 IEEE Conference on Computer Vision and Pattern Recognition, Jun. 2008, pp. 1-8.
Philbin, J. et al., "Object retrieval with large vocabularies and fast spatial matching," 2007 IEEE Conference on Computer Vision and Pattern Recognition, Jun. 2007, pp. 1-8.
Prim, R. C., "Shortest connection networks and some generalizations," Bell System Technical Journal, vol. 36, No. 6., Nov. 1957, pp. 1389-1401.
Radenović, F. et al., "Fine-tuning CNN image retrieval with no human annotation," arXiv:1711.02512, Jul. 10, 2018, pp. 1-14.
Radenović, F. et al., "Revisiting Oxford and Paris: Large-Scale Image Retrieval Benchmarking," IEEE Computer Vision and Pattern Recognition Conference, Jun. 2018, pp. 5706-5715.
Sivic, J. et al., "Video google: A text retrieval approach to object matching in videos," Proceedings of the Ninth IEEE International Conference on Computer Vision (ICCV 2003), Oct. 2003, pp. 1-8.
Tenenbaum, J.B. et al., "A global geometric framework for nonlinear dimensionality reduction," Science, vol. 290, Dec. 22, 2000, pp. 2319-2323.
Tolias, G. et al., "Particular object retrieval with integral max-pooling of CNN activations," arXiv:1511.05879, Nov. 18, 2015, pp. 1-11.
Tolias, G. et al., "Visual query expansion with or without geometry: refining local descriptors by feature aggregation," Pattern recognition, Apr. 2, 2014, pp. 1-12.
Weyland, T. et al., "Discovering favorite views of popular places with iconoid shift," IEEE International Conference on Computer Vision, Nov. 2011, pp. 1-8.
Yang, F. et al., "Re-ranking by multi-feature fusion with diffusion for image retrieval," IEEE Winter Conference on Applications of Computer Vision (WACV), 2015, pp. 572-579.
Yang, X. et al., "Locally constrained diffusion process on locally densified distance spaces with applications to shape retrieval," 2009 IEEE Computer Society Conference on Computer Vision and Pattern Recognition Workshops, Jun. 2009, pp. 1-8.
Zhang, S. et al., "Query specific fusion for image retrieval," European Conference on Computer Vision, Oct. 2012, pp. 660-673.
Zhou, D. et al., "Ranking on Data Manifolds," Advances in Neural Information Processing Systems, Jun. 2004, pp. 1-8.
Danfeng Qin et al: "Hello neighbor: Accurate object retrieval with k-reciprocal nearest neighbors," Computer Vision and Pattern Recognition (CVPR), 2011 IEEE Conference on, IEEE, Jun. 20, 2011 (Jun. 20, 2011), pp. 777-784, XP032037875, DOI: 10.1109/CVPR. 2011.5995373, ISBN: 978-1-4577-0394-2.
EPO Extended Search Report issued in EP Application 19886753.3 dated Dec. 16, 2021, 10 pages.

* cited by examiner

AUTOMATED IMAGE RETRIEVAL WITH IMAGE GRAPH

CROSS REFERENCE TO RELATED APPLICATIONS

This application claims the benefit of U.S. Provisional Application No. 62/770,159, filed Nov. 20, 2018, which is incorporated by reference in its entirety.

BACKGROUND

This invention relates generally to retrieving images relevant to a query image, and more particularly to identifying relevant images by exploring and traversing an image retrieval graph.

Identifying related images by computing systems is a challenging problem. From a query image used as an input, image retrieval systems attempt to identify relevant images that are similar or related to the query image. Related images share features with one another, and for example may be different images taken of the same scene, environment, object, etc. Though sharing such similarities, images may vary in many ways, even when taken of the same context. Lighting, viewing angle, background clutter, and other characteristics of image capture may change the way that a given environment appears in an image, increasing the challenge of identifying these related images. For example, four different images of the Eiffel Tower may all vary in angle, lighting, and other characteristics. Using one of these images to identify the other three in a repository of thousands or millions of other images is challenging. As a result, the rate of successfully identifying relevant images (and excluding unrelated images) in existing approaches continues to need improvement. In addition, many approaches may also be computationally intensive and require significant analysis when the query image is received by the image retrieval system, which can prevent these approaches from effectively operating in live executing environments.

SUMMARY

An image retrieval system uses an image retrieval graph to identify images relevant to an image designated in a query. The image retrieval graph represents images as image nodes that are connected by edges in the graph. The edges have an edge weight that represents the similarity of two images. The image retrieval graph in one embodiment is generated by identifying relevant images to connect in the graph and then identifying a weight for the edge connecting the relevant images in the image retrieval graph. Each image may be represented by an image descriptor that characterizes the image as a vector. To determine relevant images, the image descriptors between a given image and other images are compared to determine a similarity score between the images based on the similarity between the descriptors. This similarity may be determined by an inner product between the image descriptors. The similarity between different images may be determined, and the highly similar images may be selected for generating edges in the graph. In one embodiment, this represents a k-NN selection: selecting the highest k images that are nearest neighbors (as measured by the similarity score) to the selected number. After selecting which images to connect with edges, weights may be assigned to the edges based on the determined similarity score, or may be determined based on a weight function, for example a function that compares the images based on inlier counts. By identifying which image nodes to connect with edges weighing the edges accordingly, an image retrieval graph is generated that connects the various images in an image repository.

To search for relevant images in the image repository, the image retrieval system receives a request identifying an image for which to identify similar images in the image repository. To identify relevant images, the image retrieval system searches the image retrieval graph. In performing the search, nodes encountered in the image retrieval graph are designated into a query result set (relevant results for the query), an exploration set (image nodes to be explored), and a traversal set (image nodes that are evaluated for relevance and addition to the query result set and the exploration set).

To perform the search according to one embodiment, the image retrieval system alternates between exploring nodes in the exploration set and traversing ("exploiting") nodes in the traversal set to add nodes to the exploration set (and the query result set) from the traversal set when the relevance of a node in the traversal set exceeds a threshold. Each iteration alternating between these steps is termed an explore-exploit iteration. The explore step identifies image nodes in the image retrieval graph that may not be directly connected to the query image and permits the search to reach image nodes distant from but relevant to the query image. The traversal/exploit step thus uses the immediate neighborhood of each image node identified as relevant to the query and identifies subsequent nodes to add to the query results and subsequently explore.

Initially, the image node for the image associated with the query is added to the exploration set. In performing an explore-exploit iteration, the iteration evaluates the exploration set to identify nodes connected to the nodes in the exploration set and updates the traversal set by adding the node to the traversal set. In the traversal set, the nodes are stored with the weight of the edges that connect the node in the traversal set to the connected node. The highest weight associated with the node when explored is stored in the traversal set and termed the traversal weight. When an image node in the exploration set is explored (i.e., its connected nodes are added/updated in the traversal set), the node is removed from the exploration set. When the exploration set is empty, the traversal set is evaluated to add additional nodes to the query result set and the exploration set. The traversal weights of the nodes are compared against a relevance threshold and when an image node's traversal weight is above the threshold, the image node is added to the exploration set and the query result set. In some embodiments, the traversal set is organized as a heap prioritized by traversal weights. In these embodiments, the system can peek at the top of the heap and pop the image node off the heap when the traversal weight is above the relevance threshold. When no nodes remain in the traversal set that are above the relevance threshold, another iteration of the explore-exploit iteration starts by exploring the newly-added image nodes in the exploration set. In some embodiments, to ensure that additional query results continue to be identified, when the exploration set is empty and no image nodes in the traversal set are above the threshold, one or more image nodes with the highest traversal weight is added to the query result set and the exploration set. This may ensure that there is always at least one node to explore. In this embodiment, the addition of the node(s) with the highest traversal weight, even if not above the threshold, may always be performed or continue until a minimum number of minimum explore-exploit iterations is performed.

The explore-exploit iterations may end when a stop condition occurs, such as when the traversal adds no additional nodes to the exploration set or when the number of query results exceeds a limit for query results.

By searching the image retrieval graph in this way, relevant images can be identified with a limited execution time based on traversal of the generated image retrieval graph. For example, this may permit the image retrieval system to perform a search without comparing or modifying underlying image descriptors to search an image retrieval graph or to evaluate similarity during runtime. When spatial verification is used to refine the edge weights, the exploration can also avoid topic drift during the search by reducing false positives that might otherwise happen when vector descriptors are compared between images. The search also thus identifies images that are still "close" to the query image because the weights are validated by the spatial verification analysis, and query results may be ordered according to when the node was encountered with sufficient relevance in the image retrieval graph.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
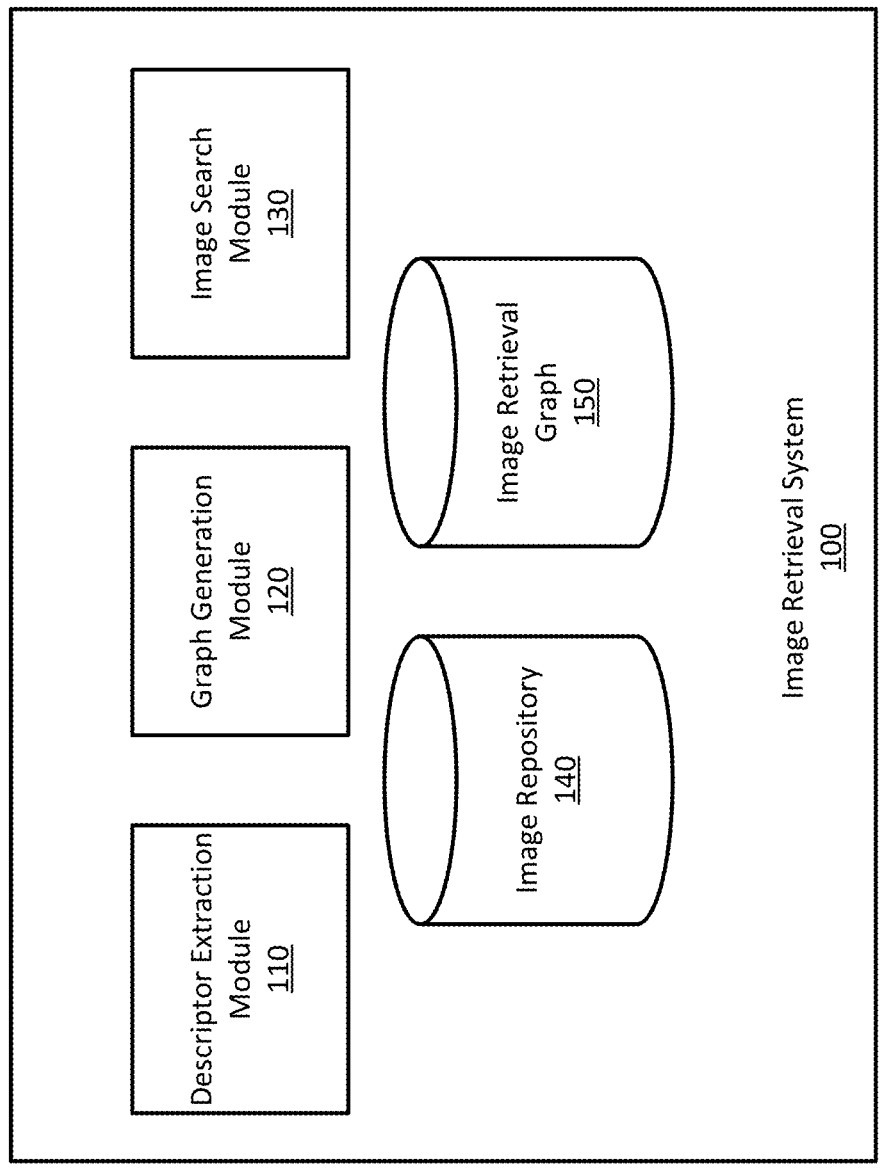
FIG. 1 shows an example image retrieval system according to one embodiment.

FIG. 1 shows an example image retrieval system 100 according to one embodiment. The image retrieval system identifies relevant images based on an image associated with a received image query. The image query may be received from another device or may be entered by a user in at the image retrieval system 100. The image retrieval system 100 includes various modules and data stores for describing images and returning relevant images in response to the query. These include a descriptor extraction module 110, a graph generation module 120, an image search module 130, an image repository 140, and an image retrieval graph 150. The image retrieval system 100 may include additional computing modules or data stores in various embodiments. Additional modules and devices that may be included in various embodiments are not shown in FIG. 1 to avoid undue complexity of description. For example, a user device providing the image query and the network through which the device communicates with the image retrieval system 100 are not shown in FIG. 1.

To prepare images for use with a query, relationships between related images is characterized by nodes in an image retrieval graph 150 with weights between the image nodes describing similarity between the images. To retrieve images related to an image query, the image retrieval system 100 identifies an image node for the query image and executes a search on the image retrieval graph 150 based on the weights between image nodes. In particular, the search alternates between 1) selecting relevant nodes to be added to the query results (termed traversing or "exploiting"), and 2) exploring the relevance of additional nodes connected to the selected nodes. This permits the search to be executed with effective results in a comparatively short time that scales efficiently with the number of images considered in the search.

The image query received by the image retrieval system 100 is associated with or otherwise specifies an image. The image retrieval system 100 identifies relevant images for the query image in the image repository 140. The image repository 140 may include thousands or millions of images of various environments and objects that can be considered as relevant results for a query. For example, the image repository 140 may include images captured be vehicles during travel, or may be images captured by individual users and uploaded to the image repository 140. Images may be considered related when they have the same person, landmark, scene, or otherwise share an object in view of the image. A particular image may be related to more than one other image. Some images in the image repository 140 may be labeled with a relationship to other images, such as identifying that two images each show the same object. These images may be used as a training set, for example, to train a descriptor model as discussed with respect to the descriptor extraction module 110. Images are typically represented in various color spaces, such as red-blue-green (RGB) or hue-saturation-value (HSV). The images in the image repository may significantly vary in appearance from one another, even for images which are related. The various images may vary significantly with respect to brightness, color, field of view, angle of view, additional objects or environment captured in the image, and so forth.

The descriptor extraction module 110 extracts image descriptors from the images of the image repository. The image descriptors are a computed description of the images that may be used to compare images in the image retrieval system 100. The image descriptors may include a vector representation of the image, which provides a compact representation that may be compared across images to determine a similarity between images as a whole. In one embodiment the vector representation is a vector of 2048 values. The image descriptors may also include feature descriptors that describe 'interesting' portions of the image, for example based on detected edges or other characteristics of the image. The feature descriptors may be used to identify matching portions of two images. Thus, while the vector representation may be a general, global characterization of the image, the feature descriptors may describe individual features, points, or sections of the image that can be compared to determine whether images match.

To generate the vector representation of an image, the descriptor extraction module 110 may apply a neural network trained to receive an image and output a vector representation of that image. The image retrieval system 100 may use a pre-trained neural network that outputs a vector representation of an image, or may train an image based on the training set of images in the image repository 140 having labeled relationships. A similarity score between images is used to train the neural network as an objective of the network, such that the similarity score is compared with the labeled relationships between images and used to train the network based on an error between predicted similarity and labeled relationship. In one embodiment, the neural network is a CNN-based R-MAC descriptor model fine-tuned for landmark retrieval. In other embodiments, the vector representation may be generated based on a model using local invariant features or a bag-of-words model.

The feature descriptors may be specific to a particular location within the image, such that different images taken of a given object generate feature descriptors that match across each image. In one embodiment the feature descriptors are generated based on a Scale Invariant Feature Transform (SIFT). In another embodiment, the feature descriptors are generated based on a deep local features model (DELF), which may use convolutional neural networks to generate features describing of portions of the image. In one embodiment, the deep local features model extracts feature vectors from an image, and the dimensionality of the vectors may be reduced based on principle component analysis (PCA).

The graph generation module 120 uses the image descriptors to generate the image retrieval graph. The graph generation module 120 evaluates the image descriptors to identify similar images and generate edge weights between the image nodes.

Figure 2:
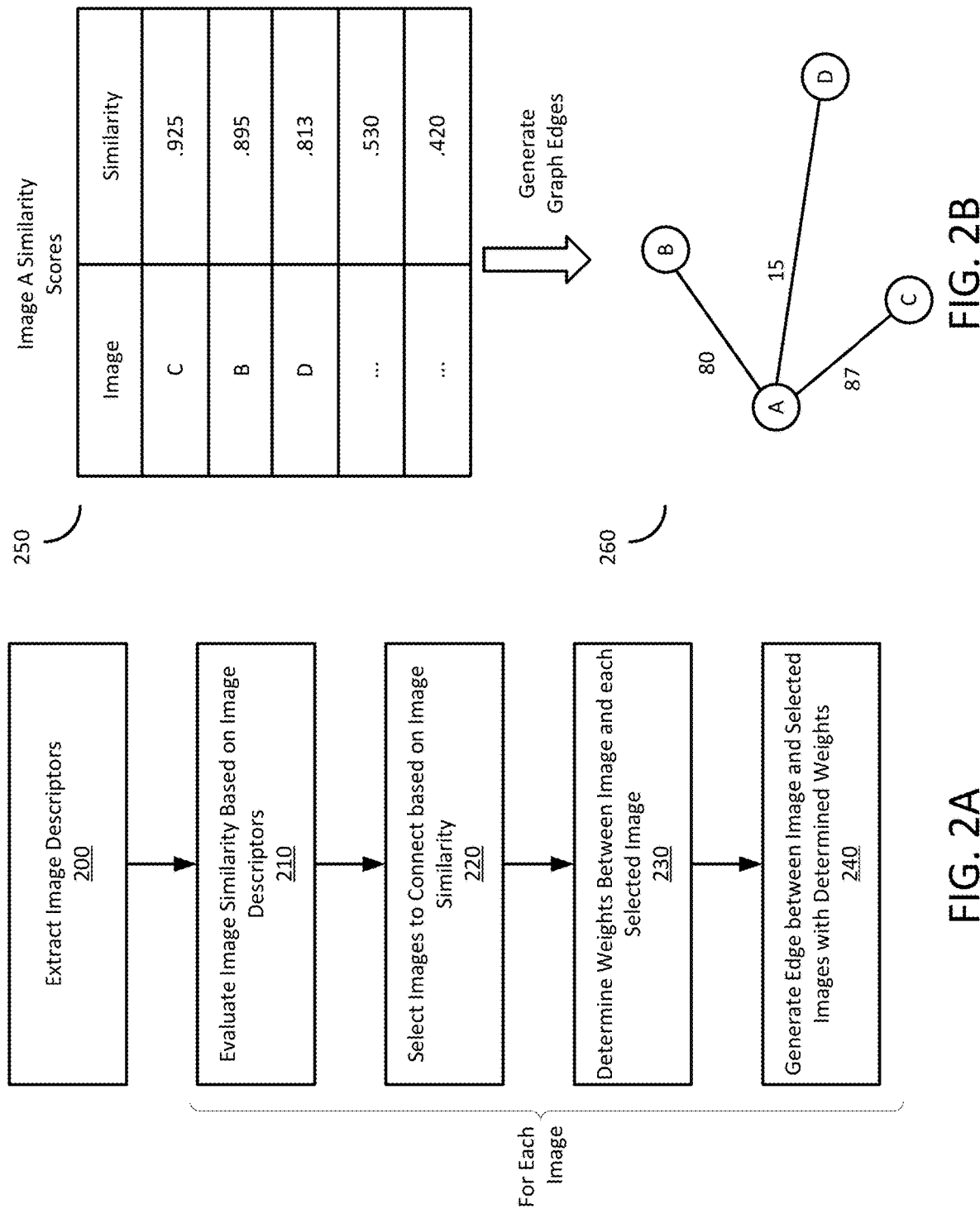
FIG. 2A shows an example process for generating edges between image nodes of the image retrieval graph, according to one embodiment.
FIG. 2B shows example similarity scores and generated edges for an image retrieval graph.

FIG. 2A shows an example process for generating edges between image nodes of the image retrieval graph, according to one embodiment. FIG. 2B shows example similarity scores and generated edges for an image retrieval graph. This process may be performed by the descriptor extraction module 110 and the graph generation module 120. Initially, image descriptors are extracted 200 from each image in the image repository, which may be performed by the descriptor extraction module 110 as discussed above. In some examples, the image descriptors for an image may be pre-generated or may already be associated with the images in the image repository. Next, the graph generation module 120 evaluates each image to identify which other images to connect with the image in the graph and what weight to assign to the edge in the graph. To identify images to connect in the graph, the graph generation module 120 evaluates similarity 210 by determining a similarity score between the subject image and other images in the image repository. In one embodiment, the similarity score is an inner product between the vector representation of the subject image and the vector representation of the other image. The inner product may be a dot product or may be another vector similarity function for comparing similarity between vectors. As a working example, a similarity score table 250 shows example similarity scores calculated for image A with respect to other images, including images B, C, D.

Next, the process selects 220 images to connect to the subject image based on the similarity scores. The similarity scores are ranked, and the top k images are selected from the ranked list. The number of selected images, k, may vary in different implementations, and may be 50, 100, 200, or more. In this embodiment, the selected images represent the nearest neighbors (k-NN) to the subject image, as measured by the similarity scores. In another embodiment, images above a threshold similarity score are selected to be connected in the image retrieval graph, which may include more or fewer than k. In another embodiment, both approaches may be used, to connect at least the top k nearest neighbors and additionally any images over the threshold score. In this example, this may ensure at least k image nodes are connected, while also allowing additional connections when more images are highly similar. As a result, the image retrieval graph may be sparse, including k-NN connections for each image node. In a repository of 1M images with a value of 100 for k, for example, each image node is connected to 100 other nodes in the image retrieval graph.

Next, a weight may be determined 230 for each pair of images to be connected. In one embodiment, the weight is the similarity score discussed above. In other embodiments, the weight may be determined based on a comparison of the feature descriptors of the images. In particular, the feature descriptors may be compared to identify features that can be matched between two images. This analysis may primarily or exclusively evaluate inliers between two images, indicating features that match between two images, even when additional features do not match. As one example, the comparison may be based on a Random Sample Consensus ("RANSAC") algorithm. This algorithm may apply various image transforms to attempt to identify feature matches across images and select a transform that permits a maximum number of features to match. The number of inliers when comparing the feature descriptors of the images may be used as the weight between images in the image retrieval graph. By using analysis based on inliers to weight edges between image nodes, the edges between nodes may thus verify actual similarity between images based on descriptions of portions of the images at a finer scale than the global description that may be determined from the similarity score determined from vector representations.

After determining weights between image nodes to be connected, an edge between the image nodes in the graph may be generated 240 with the determined weight. In one embodiment, the connections and weights between image nodes may be represented as a sparse matrix, where a value of zero (or no value) at an intersection of two image nodes represents no edge between the image nodes, and a nonzero value is the weight of the edge between the nodes at the position.

A partial image retrieval graph 260 shows the connection between image nodes representing image A and the corresponding weights in one embodiment. In this example, three image nodes are selected for image A, for example if k is 3 in a k-NN approach to connected node selection. After weighting the nodes, weights may be generated as shown in the partial image retrieval graph 260. In this example, while the nodes were selected based on the similarity scores as shown in the example similarity score table 250, the nodes are assigned weights that are generated based on identified inliers between the images. In this example, the inlier score between images A and C is 87, between A and B is 80, and between A and D is 15. This example illustrates that although images A and D have a similarity score that was high enough to include an edge between A and D, the verification based on comparison of feature descriptors yielded a relatively low inlier score between A and D. This process may be repeated for each of the images to be added to the image retrieval graph 150 to select 220 nodes and generate 240 edges between them.

Figure 3:
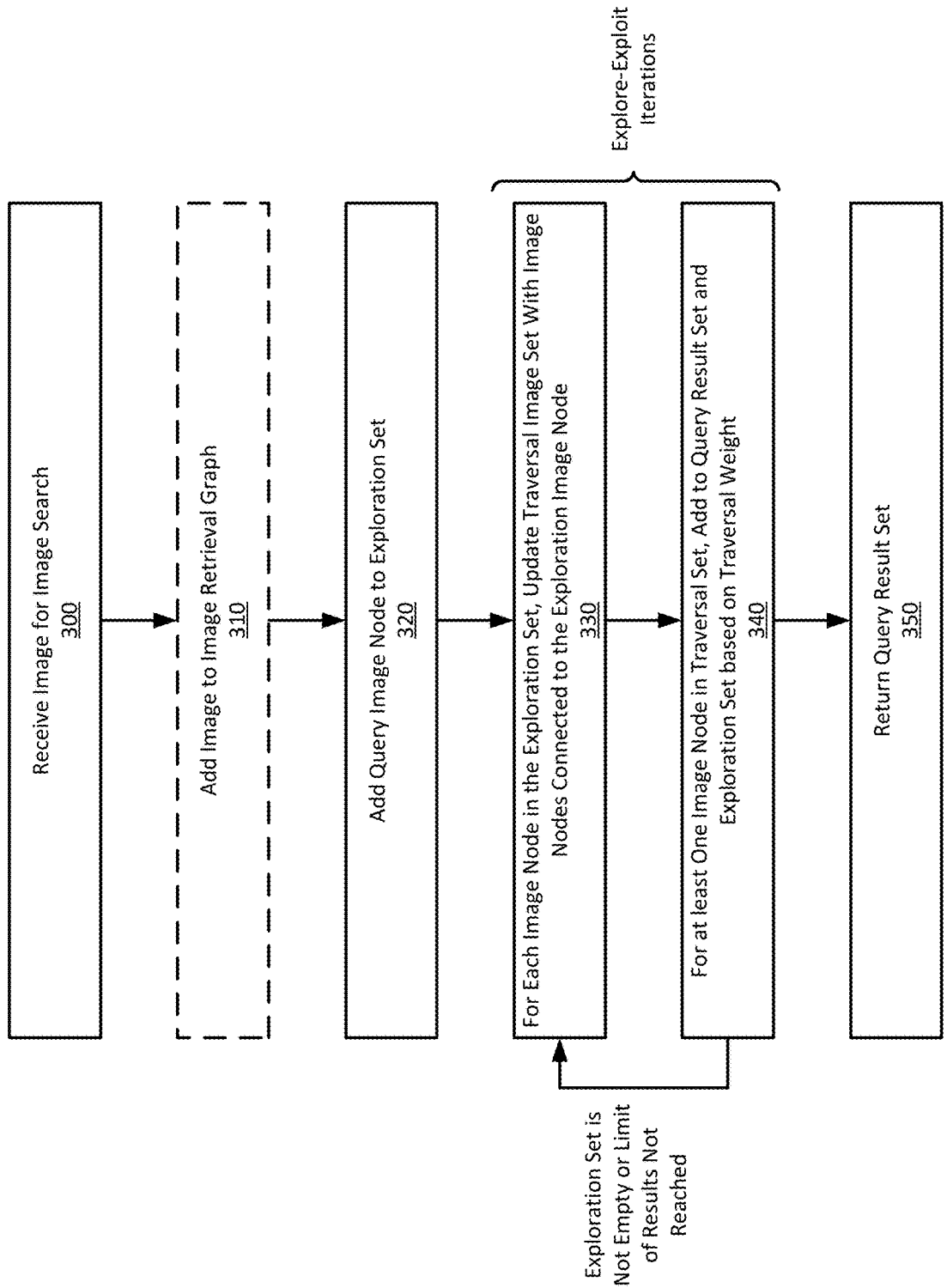
FIG. 3 shows a process for performing an image query on an image retrieval graph, according to one embodiment.

FIG. 3 shows a process for performing an image query on an image retrieval graph, according to one embodiment. This process may be performed by the image search module 130 with respect to the image retrieval graph 150. To begin the process, the image search module 130 receives 300 a search query indicating an image for which to identify related images. The query may include the image, or may specify an image at another location, such as an image in the image repository 140. Next, the image search module 130 identifies whether the image has an associated image node in the image retrieval graph. When the image does not have an associated image node, the image is added 310 to the image retrieval graph. As discussed with respect to FIG. 2, image descriptors may be extracted from the image, similar images may be selected for which to generate an edge, and edges generated with weights based on the similarity between the images. Accordingly, when an image search is requested for a new image, the new image can be quickly added to the image retrieval graph without requiring modification to the image nodes or edges related to other images. In addition, subsequent requests with that image may be processed quickly because the image may already be included in the image retrieval graph.

To perform the search, the image search module 130 uses sets of image nodes to organize the search. These sets of image nodes may include a query result set, an exploration set, and a traversal set. Initially, each of these sets may be initialized as empty. To begin the search, the query image node associated with the query image is added 320 to the exploration set. During execution of the search, the image search module 130 may use explore-exploit iterations to alternate between exploring edges from image nodes of interest ("exploring"), and evaluating edges to identify additional nodes of interest ("exploiting").

The query result set stores the set of image nodes for images to be returned as relevant results of the query. The query result set may store the query results as an ordered list or queue, such that additional items added to the query result set are added to the tail of the query result set and the items in the query result set are also typically ordered according to expected relevance. In embodiments in which the image graph is traversed according to relevance, the relevance order is a result of the traversal order and may require no further analysis to determine a result order.

During the explore phase, the edges connected to nodes in the exploration set are explored to identify the relevance of other nodes based on the connection to a node of interest in the exploration set. As the edges for each image node in the exploration set are evaluated, the image nodes connected to an image node in the exploration set are updated 330 in the traversal set. The traversal set stores a set of image nodes that are connected to explored nodes and includes a traversal weight associated with the image node. The traversal weight in the traversal set may specify the highest edge weight encountered by the query as nodes are explored. In this way, the traversal weight represents a relevance of a given image node based on the nodes that are of interest in the current query exploration. In one embodiment image nodes are popped from the exploration set and the edges connected to that node are updated in the traversal set.

Accordingly, to update the traversal set, an image node that has not previously been explored (e.g., is not in the traversal set), may be added to the traversal set with a traversal weight of the edge weight connecting the explored image node to the node of interest. For image nodes that have previously been explored (e.g., is in the traversal set), the traversal weight may be updated with the edge weight connected to the currently-explored image node. When the edge weight is higher than the traversal weight, the traversal weight may be set to the edge weight, and when the edge weight is lower, the traversal weight may be unchanged. When an image node is already in the query result set, the traversal set is not updated, since that image node was already explored.

In some embodiments, the traversal set is organized as a heap that prioritizes image nodes according to the traversal weight, such that the top item in the heap is the image node with the highest traversal weight. The traversal set may also be stored or ordered in structures such that the highest traversal weights may be readily identified.

During the traversal or "exploit" phase, the image nodes in the traversal set are evaluated to determine which are sufficiently relevant to be added to the query result set and to the traversal set. At least one image node in the traversal set is added 340 to the query set and the exploration set based on the traversal weights of the image nodes.

As one example, the traversal weight is compared to a relevance threshold and images nodes above that threshold are considered relevant to the search query and added 340 to the query result set and the exploration set. In embodiments in which the traversal set is a heap, the traversal phase peeks at the top traversal value of the traversal set, and when the traversal value exceeds the relevance value, the image node is popped off the traversal set and added to the query result set and exploration set. The next image node is peeked at until the top traversal value is not above the relevance threshold. Because the image nodes may be evaluated in the traversal set according to the traversal weights, the addition of the image nodes to the query result set is in an expected relevance order. In one embodiment, when the traversal node of an image node does not exceed the relevance threshold, the image node may be kept in the traversal set, such that each image node evaluated in the query traversal is present in either the query result set or the traversal set. In another embodiment, when the traversal set has no traversal weights over the relevance threshold, the traversal set may be emptied at the end of the traversal phase.

In one embodiment, when no nodes in the traversal set have a traversal weight over the relevance threshold, at least one node is added to the exploration set from the traversal set to ensure that the query continues to identify query results. Stated another way, in this embodiment the traversal phase adds at least a minimum number of image nodes in the traversal set to the query result set and the exploration set and also includes additional nodes in the traversal set that have a traversal weight above the relevance threshold. The inclusion of these nodes below the relevance threshold may be performed for each explore-exploit iteration, and in some embodiments is performed for a limited number of explore-exploit iterations or until a minimum number of image nodes are in the query result set.

Using the alternating explore-exploit iteration, the search thus evaluates nodes closer to the query image node and explores the graph when edge weights are high enough to meet a relevance threshold. As a result, the query can be executed without modifying the image retrieval graph (except, if necessary, to add 310 the query image) and repeat queries can be executed without requiring run-time comparison of image descriptors. Further, image nodes that initially may not appear relevant to the initial query (e.g., by having no edge or an edge weight below the relevance threshold) may become relevant as other image nodes are explored that do have a sufficiently high edge weight to the image node (thus putting the traversal weight of the image node over the relevance threshold). Similarly, when the edge weights are based on an inlier count, the relevance threshold can reduce false positives and ensure sufficient relationship between the images. This is illustrated for image nodes D and E in the example discussed below. In additional embodiments, the relevance score may be increased based on the number of explore-exploit iterations, such that as the query explores further away from the query image, the threshold for continuing the query increases.

The explore-exploit iterations may be repeated until a stop condition is reached, such as a number of query result reaching a maximum, or until the exploration set is empty after a traversal phase (e.g., no nodes in the traversal set exceed the relevance threshold and none were added to the exploration set).

Figure 4A:
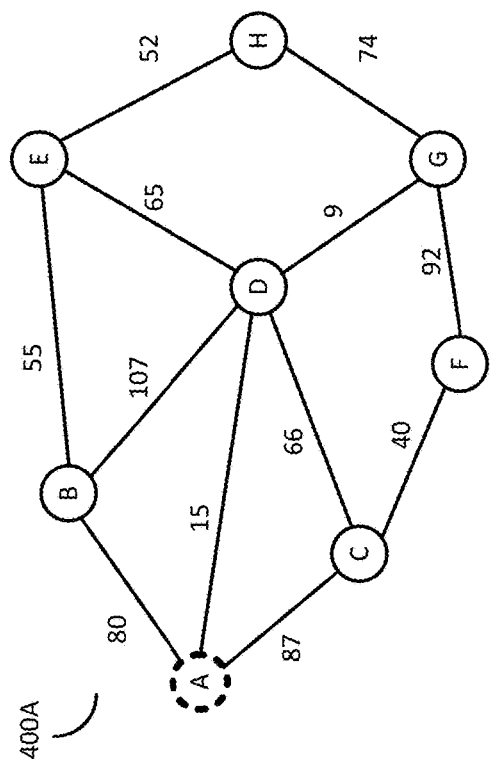
FIGS. 4A-H shows an example query execution for an example image retrieval graph and corresponding status of a query result set, an exploration set, and a traversal set.

FIGS. 4A-H shows an example query execution for an example image retrieval graph 400A-H and corresponding status of a query result set 410A-H, an exploration set 420A-H, and a traversal set 430A-H. In this example, the threshold for relevance is a traversal weight of 60. In this example, the query image corresponds to image node A and FIG. 4A illustrates the addition of the query image node to the exploration set 420A. In the image retrieval graph 400A-400H, nodes which are included in the exploration set have a dotted border, nodes which have been explored are filled with a diagonal pattern, and edge connections in the traversal set are illustrated with dashed lines.

Figure 4B:
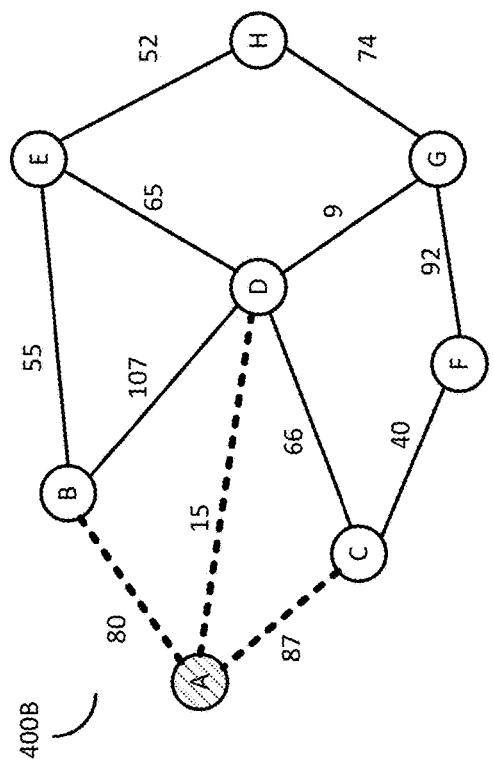

Between FIGS. 4A and 4B, an explore phase is performed to explore edges for the exploration set 420A, which includes image node A. The edges connected to image node A are used to update the traversal set, such that the connection from node A to node C having a weight of 87, the connection from node A to node B having a weight of 80, and the connection from node A to node D having a weight of 15 are added to the traversal set 430B as shown in FIG. 4B. Next, a traversal phase is performed between FIGS. 4B and 4C. During this phase, the traversal set 430B is evaluated with respect to the relevance threshold. Initially, image node C is evaluated with respect to its traversal weight of 87. This value is higher than the relevance threshold of 60, so image node C is removed from the traversal set and added to the query result set 410C and exploration set 420C. Likewise, image node B has a traversal weight of 80, which is higher than the relevance threshold of 60, so image node B is removed from the traversal set and added to the query result set 410C and exploration set 420C. When the traversal weight of image node D is evaluated, it has a traversal weight of 15, which is lower than the threshold relevance, so image node D remains in the traversal set 430B. Since the traversal set now has no image nodes with a traversal weight above the relevance threshold, the traversal phase ends and the process may evaluate whether to perform another explore-exploit iteration. In this case, there are image nodes in the exploration set 230C remaining to be explored, so another explore-exploit iteration is performed.

Figure 4C:
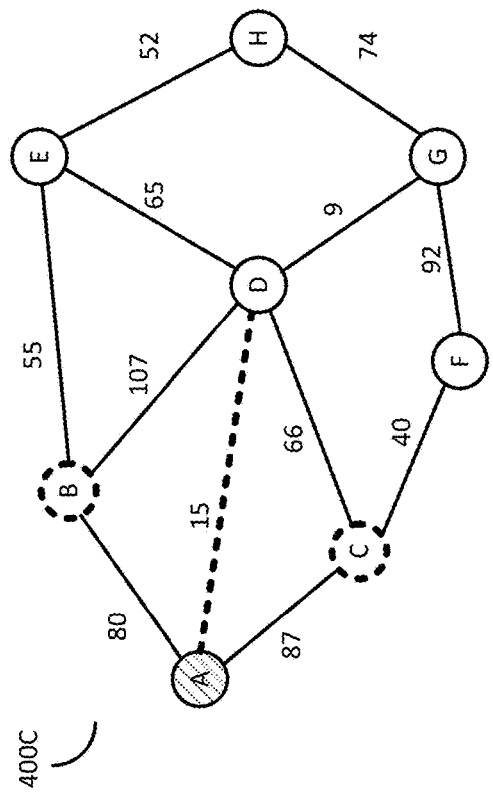
Figure 4D:
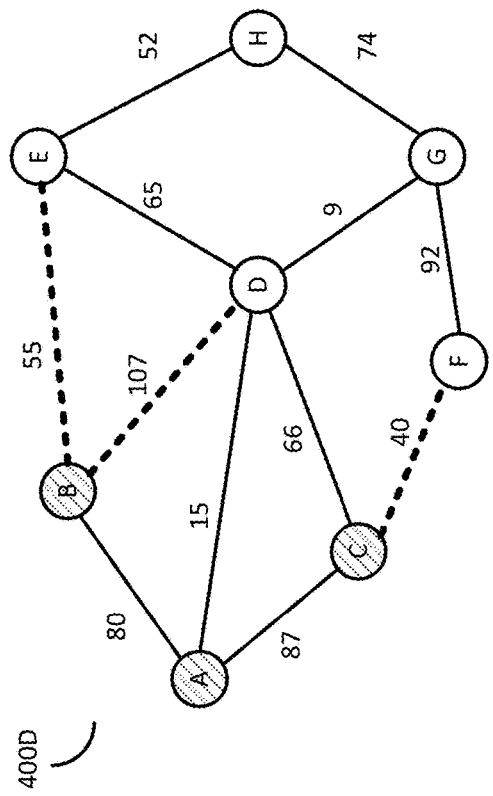

From FIG. 4C to 4D, another exploration phase is performed, which now explores from the nodes identified as relevant from the prior exploit phase. In this exploration phase, the image node C is explored and removed from the exploration set 420C followed by image node B until the exploration set is empty as shown in exploration set 420D. In exploring image node C, the traversal set 430C is updated with the edge from image node C to image node F with a traversal weight of 40, and the edge from image node C to image node D with a traversal weight of 66. Image node C and image node B also have an edge connecting to image node A, which is not added to the traversal set because it is the query image node. In exploring image node B, the traversal set 430C is updated with the edge from image node B to image node E with a traversal weight of 55, and the edge from image node B to image node D with a traversal weight of 107. In updating with the edge from image node B to image node D, the traversal weight may update the traversal weight for image node D that was determined from the edge from image node C to image node D (i.e., that had a value of 66). When the exploration set 420C is empty, the process proceeds to a traversal phase for FIG. 4D to examine the traversal set 430D and progress to FIG. 4E. In traversing the traversal set 430D, the traversal weight for image node D is 107, which is above the relevance threshold of 60, and image node D is thus added to the query result set 410E and exploration set 420E and removed from the traversal set 430E. The remaining image nodes E and F have traversal weights below the relevance threshold, so the traversal phase ends. The process evaluates whether to perform an additional explore-exploit iteration and based on the image node (image node D) now in the exploration set, another iteration is performed as shown in FIGS. 4E-4F.

Figure 4E:
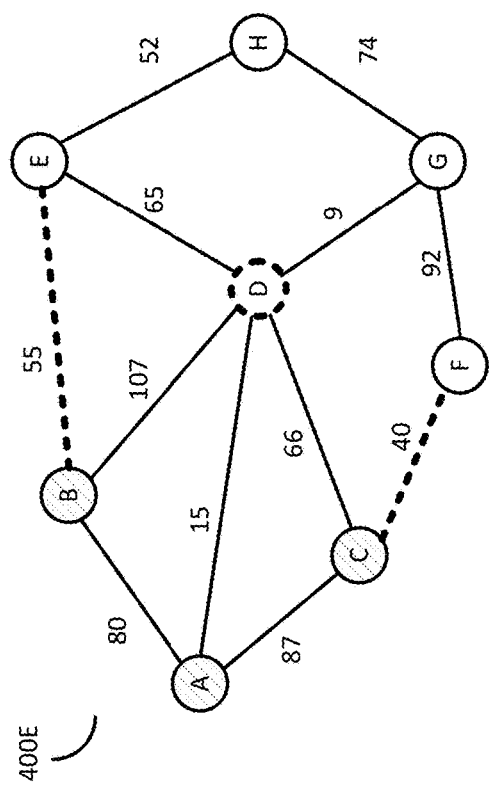
Figure 4F:
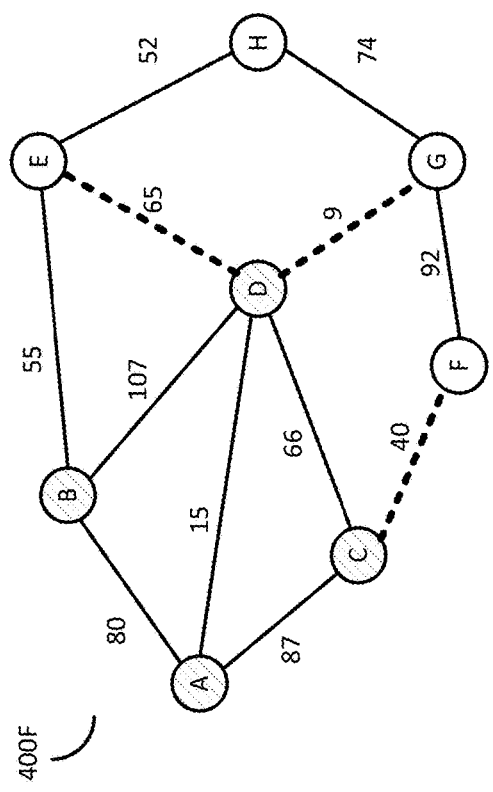
Figure 4G:
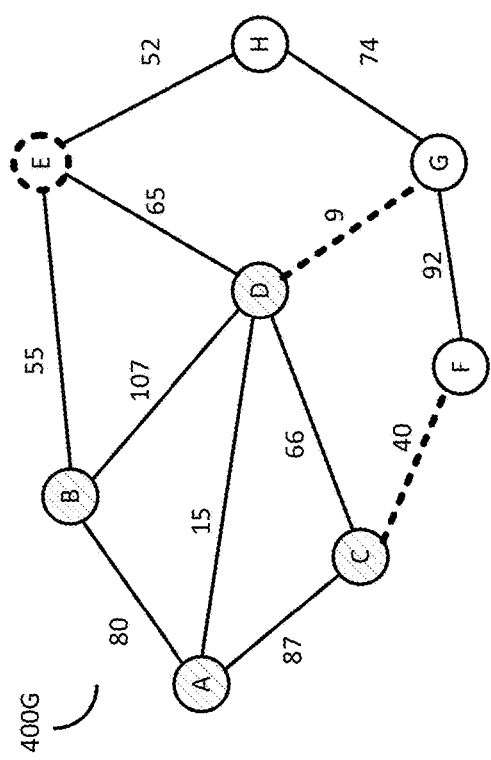
Figure 4H:
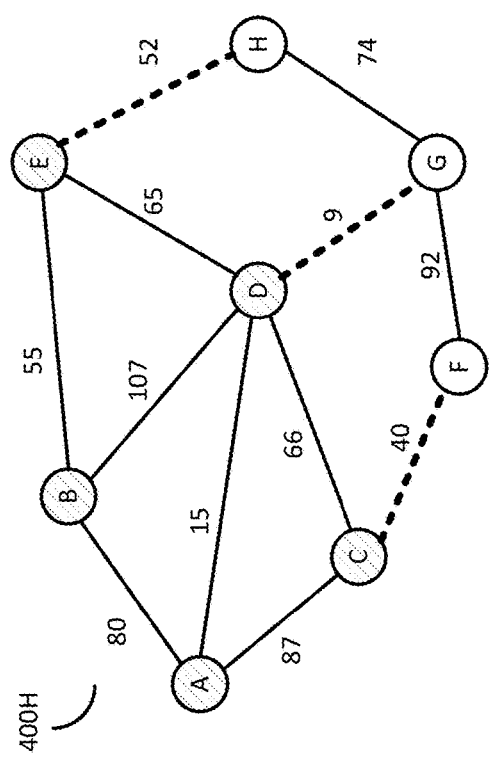

From FIG. 4E to 4F, an exploration phase is performed to explore the image node in the exploration set 420E. In this phase, the image node D in the exploration set 420E is evaluated, which has edges to image nodes A, B, C, E, and G. Image node A is the query image node, and image nodes B and C are already in the query result set (and previously explored) so these nodes are not updated in the traversal set 420E. The edge from image node D to image node E has an edge weight of 65, and which is updated in the traversal set 430F to replace the prior traversal weight of 55. To update with the edge weight from image node D to image node G, image node G is added to the traversal set 430F with a traversal weight of 9. After evaluating the connections to image node D, the image node D is removed from the exploration set 420E and the exploration set is empty, allowing the process to continue to a traversal phase for FIG. 4F. In traversing the traversal set 430F, the traversal weight for image node E now exceeds the relevance threshold (unlike in FIG. 4D), and image node E may be added to the query result set 410G and the exploration set 420G and removed from the traversal set 430G. The process determines to perform an additional explore-exploit iteration because the exploration set 420G is not empty. From FIG. 4G to FIG. 4H, the explore phase evaluates image node E in the exploration set 420G. Edges from image node E to image nodes B and D are not updated to the traversal set 430G because those image nodes were previously explored and are included in the query result set 410G. The edge from image node E to image node H is updated in the traversal set 430H and with a traversal weight of 52. After exploring image node E, the exploration set 420H is empty, and the exploration phase ends. In one embodiment, at the traversal phase, no image nodes in the traversal set exceeds the relevance threshold of 60. In this embodiment, at the end of this explore-exploit iteration, there are no image nodes in the exploration set 420H, indicating that there are no further image nodes to consider of sufficient relevance in the graph.

In other embodiments (not shown) in which the traversal phase includes at least one image node from the traversal set (regardless of whether the highest traversal weight exceeds the relevance threshold), image node H may be added to the exploration set and the query result set as having the highest traversal weight in the traversal set 430H. In this embodiment, additional explore-exploit iterations explore image node H and may be followed by image node G and finally image node F.

Finally, the images associated with the image nodes in the result query set 410 are returned as the query result set of images for the image associated with image node A.

As shown by this example, the explore-exploit iterations permits effective exploration of the image retrieval graph 400A-H and preserves a relevance order in the query result set based on the order in which nodes were encountered as they became sufficiently relevant in the traversal set. In addition, because the nodes can be traversed based on the weights, additional analysis is not required to evaluate the individual images at runtime of the search query. As a result, this approach provides an effective way to perform an image query with a low runtime (particularly for images that already exist in the image retrieval graph) and effectively identifies additional images in the repository without significant deviation from the character of the query image.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the disclosure is intended to be illustrative, but not limiting, of the scope of the invention, which is set forth in the following claims.

What is claimed is:

1. A computer system for automated image retrieval, the computer system comprising:
   a processor configured to execute instructions;
   a non-transient computer-readable medium comprising instructions that when executed by the processor cause the processor to:
      receive a request from a client device to retrieve images relevant to a query image;
      access an image retrieval graph having a set of image nodes representing a set of images and connected by a set of edges having edge weights representing similarity between the images represented by the connected image nodes;
      add an image node in the set of image nodes to an exploration set of image nodes, the exploration set indicating nodes having edges to be explored;
      initialize a traversal set of image nodes, the traversal set indicating nodes connected to relevant query results and associated traversal weights for determining whether to explore an image node;
      perform explore-exploit iterations until a stop condition, each iteration including:
         for each image node in the exploration set, identifying image nodes connected to the image node in the image retrieval graph, adding the connected image node to the traversal set with a traversal weight based on the edge weight connecting the image node and the connected node, and removing the image node from the exploration set; and
         for at least one image node in the traversal set selected based on the traversal weights, adding the image node to a query result set and the exploration set and removing the image node from the traversal set;
      return the query result set to the client device.

2. The computer system of claim 1, wherein the stop condition is an empty exploration set or the query result set reaching a maximum number of results.

3. The computer system of claim 1, wherein the image nodes in the image retrieval graph are connected to a subset of image nodes.

4. The computer system of claim 1, wherein the image retrieval graph is sparsely connected.

5. The computer system of claim 1, wherein the exploration set of image nodes is an ordered queue.

6. The computer system of claim 1, wherein the traversal set of image nodes is a heap prioritized by traversal weights.

7. The computer system of claim 1, wherein the image nodes connected in the image retrieval graph are selected based on a ranked number of a k-nearest neighbor (k-NN).

8. The computer system of claim 1, wherein the edge weights of the set of edges in the image retrieval graph is based on an inlier score of a Random Sample Consensus (RANSAC) algorithm.

9. A method for automated image retrieval, the method comprising:
   receiving a request from a client device to retrieve images relevant to a query image;
   accessing an image retrieval graph having a set of image nodes representing a set of images and connected by a set of edges having edge weights representing similarity between the images represented by the connected image nodes;
   adding an image node in the set of image nodes to an exploration set of image nodes, the exploration set indicating nodes having edges to be explored;
   initializing a traversal set of image nodes, the traversal set indicating nodes connected to relevant query results and associated traversal weights for determining whether to explore an image node;

performing explore-exploit iterations until a stop condition, each iteration including:
  for each image node in the exploration set, identifying image nodes connected to the image node in the image retrieval graph, adding the connected image node to the traversal set with a traversal weight based on the edge weight connecting the image node and the connected node, and removing the image node from the exploration set; and
  for at least one image node in the traversal set selected based on the traversal weights, adding the image node to a query result set and the exploration set and removing the image node from the traversal set;
returning the query result set to the client device.

10. The method of claim 9, wherein the stop condition is an empty exploration set or the query result set reaching a maximum number of results.

11. The method of claim 9, wherein the image nodes in the image retrieval graph are connected to a subset of image nodes.

12. The method of claim 9, wherein the image retrieval graph is sparsely connected.

13. The method of claim 9, wherein the exploration set of image nodes is an ordered queue.

14. The method of claim 9, wherein the traversal set of image nodes is a heap prioritized by traversal weights.

15. The method of claim 9, wherein the image nodes connected in the image retrieval graph are selected based on a ranked number of a k-nearest neighbor (k-NN).

16. The method of claim 9, wherein the edge weights of the set of edges in the image retrieval graph is based on an inlier score of a Random Sample Consensus (RANSAC) algorithm.

17. A non-transitory computer-readable medium containing computer program code that are executable by a processor for the processor to perform steps of:
  receiving a request from a client device to retrieve images relevant to a query image;
  accessing an image retrieval graph having a set of image nodes representing a set of images and connected by a set of edges having edge weights representing similarity between the images represented by the connected image nodes;
  adding an image node in the set of image nodes to an exploration set of image nodes, the exploration set indicating nodes having edges to be explored;
  initializing a traversal set of image nodes, the traversal set indicating nodes connected to relevant query results and associated traversal weights for determining whether to explore an image node;
  performing explore-exploit iterations until a stop condition, each iteration including:
    for each image node in the exploration set, identifying image nodes connected to the image node in the image retrieval graph, adding the connected image node to the traversal set with a traversal weight based on the edge weight connecting the image node and the connected node, and removing the image node from the exploration set; and
    for at least one image node in the traversal set selected based on the traversal weights, adding the image node to a query result set and the exploration set and removing the image node from the traversal set;
  returning the query result set to the client device.

18. The non-transitory computer-readable medium of claim 17, wherein the traversal set of image nodes is a heap prioritized by traversal weights.

19. The non-transitory computer-readable medium of claim 17, wherein the image nodes connected in the image retrieval graph are selected based on a ranked number of a k-nearest neighbor (k-NN).

20. The non-transitory computer-readable medium of claim 17, wherein the edge weights of the set of edges in the image retrieval graph is based on an inlier score of a Random Sample Consensus (RANSAC) algorithm.

* * * * *